(12) United States Patent
Essen

(10) Patent No.: US 7,139,293 B1
(45) Date of Patent: Nov. 21, 2006

(54) METHOD AND APPARATUS FOR CHANGING THE DATA RATE OF A DATA SIGNAL

(75) Inventor: Sophie H. Essen, Cupertino, CA (US)

(73) Assignee: Redbacks Network Inc., San Jose, CA (US)

( * ) Notice: Subject to any disclaimer, the term of this patent is extended or adjusted under 35 U.S.C. 154(b) by 974 days.

(21) Appl. No.: 10/035,538

(22) Filed: Oct. 23, 2001

(51) Int. Cl.
 *H04J 3/22* (2006.01)
 *H04L 12/50* (2006.01)
 *H04L 12/54* (2006.01)

(52) U.S. Cl. .................. 370/545; 370/388; 370/429

(58) Field of Classification Search ............... 370/388, 370/428–429, 545, 907, 401, 412–414; 709/233–234
See application file for complete search history.

(56) References Cited

U.S. PATENT DOCUMENTS

| | | | | |
|---|---|---|---|---|
| 5,592,629 | A * | 1/1997 | Gamble | 710/51 |
| 6,052,376 | A * | 4/2000 | Wills | 370/419 |
| 2002/0186719 | A1 * | 12/2002 | Subrahmanyan et al. | 370/506 |

OTHER PUBLICATIONS

Newton, Newton's Telecom Dictionary, Oct. 1998, Telecom Books, pp. 535 and 732.*

Cypress: Technical Articles—Understanding Speciality Memories: FIFOs (Intro), http://www.cypress.com/design/techarticles/v2n3. html, 3 pages, Jan. 30, 2002.
Cypress: Technical Articles—Use a CPLD and FIFOs to Convert Bus Width, http://www.cypress.com/design/techarticles/v2n3p6. html, 2 pages, Jan. 30, 2002.
Cypress: Technical Articles—Build a FIFO 'Dipstick' with a CY7371i CPLD, http://www.cypress.com/design/techarticles/v2n2p7.html, 3 pages, Jan. 30, 2002.

* cited by examiner

*Primary Examiner*—Chi Pham
*Assistant Examiner*—Ronald Abelson
(74) *Attorney, Agent, or Firm*—Blakely, Sokoloff, Taylor & Zafman LLP

(57) ABSTRACT

A method and apparatus for the transmission of data through multiple clock domains using synchronous and asynchronous FIFOs are described. In an embodiment, a method includes receiving data at a first data transfer rate. Additionally, the method includes storing the data at the first data transfer rate in a synchronous storage device having a first storage area. The data at the first data transfer rate stored in the synchronous storage device is processed. The processing includes removing the data from the synchronous storage device. The processing also includes storing the data at the first data transfer rate in an asynchronous storage device having a second storage area. Additionally, the processing includes transmitting the data out from the asynchronous storage device at a second data transfer rate, wherein the storage area of the synchronous storage device is larger than the second storage area of the asynchronous storage device.

20 Claims, 4 Drawing Sheets

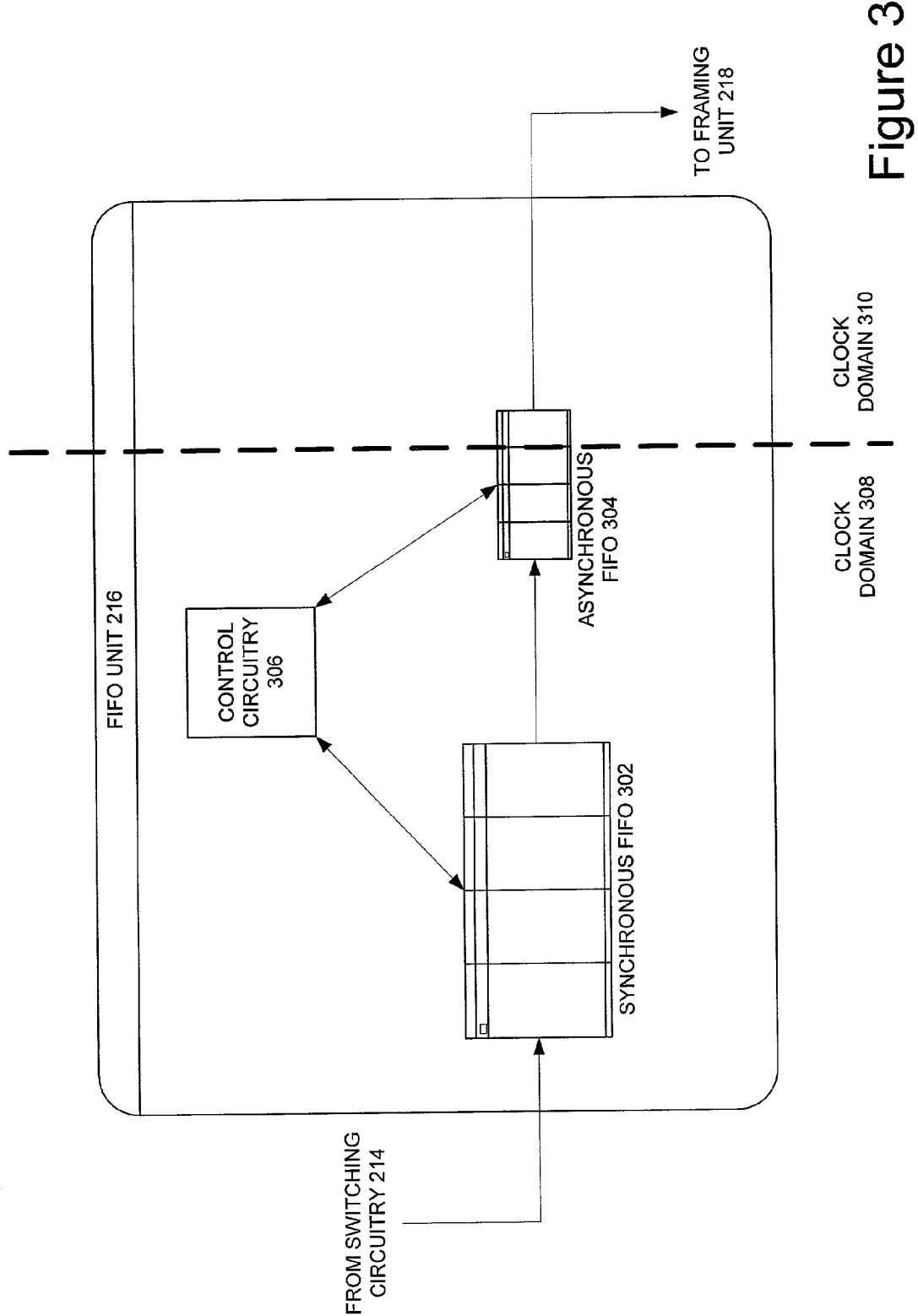

METHOD AND APPARATUS FOR CHANGING THE DATA RATE OF A DATA SIGNAL

FIELD OF THE INVENTION

The invention relates to the field of data communications. More specifically, the invention relates to the transmission of data through multiple clock domains using synchronous and asynchronous storage devices.

BACKGROUND OF THE INVENTION

Typically, first-in-first-out register arrays ("FIFOs") have been used to store and transmit data. When storing and transferring data within a same clock domain, i.e., rate of data transfer, a synchronous FIFO is used. In contrast, when storing and transferring data between two clock domains, an asynchronous FIFO is used. In particular, an asynchronous FIFO allows for the storage and extraction of data while converting the data from a first clock domain to a second clock domain. Control circuitry containing flip-flops, pointers, double-sync logic, gray code conversion tables, etc. is used to control the traversal of the data through the FIFOs.

When large amounts of data are to be stored and transmitted through multiple clock domains, a large asynchronous FIFO and corresponding control circuitry are necessary. For an asynchronous FIFO of size $2^N$ bits, N-bit sized pointers are necessary for the operation of the FIFO. For example, if an asynchronous FIFO is of size $2^{12}$ bits, the pointers and logic tables contained within the control circuitry can be as large as 12 bits each. This amounts to a large amount of space required for the control circuitry. Also, the amount of time required to implement such a large asynchronous FIFO is increased due to the large double-sync logic and gray code tables. For example, to determine whether the asynchronous FIFO is full, the control circuitry must traverse the entire asynchronous FIFO and cross multiple clock domains.

SUMMARY OF THE INVENTION

A method and apparatus for the transmission of data through multiple clock domains using synchronous and asynchronous FIFOs are described. In an embodiment, a method includes receiving data at a first data transfer rate. Additionally, the method includes storing the data at the first data transfer rate in a synchronous storage device having a first storage area. The data at the first data transfer rate stored in the synchronous storage device is processed. The processing includes removing the data from the synchronous storage device. The processing also includes storing the data at the first data transfer rate in an asynchronous storage device having a second storage area. Additionally, the processing includes transmitting the data out from the asynchronous storage device at a second data transfer rate, wherein the storage area of the synchronous storage device is larger than the second storage area of the asynchronous storage device.

BRIEF DESCRIPTION OF THE DRAWINGS

Embodiments of the invention may be best understood by referring to the following description and accompanying drawings that illustrate such embodiments. The numbering scheme for the Figures included herein are such that the leading number for a given element in a Figure is associated with the number of the Figure. For example, system 100 can be located in FIG. 1. However, element numbers are the same for those elements that are the same across different Figures.

In the drawings:

FIG. 3 illustrates portions of FIFO unit 216, according to embodiments of the present invention.

DETAILED DESCRIPTION

A method and apparatus for the transmission of data through multiple clock domains using synchronous and asynchronous first-in-first-out register arrays ("FIFOs") are described. In the following description, for purposes of explanation, numerous specific details are set forth in order to provide a thorough understanding of the present invention. It will be evident, however, to one skilled in the art, that the present invention may be practiced without these specific details.

Embodiments of the present invention are described in terms of the processing of data through a network element. However, embodiments of the present invention are not so limited, as any other type of system wherein data is transferred from a first clock domain to a second clock domain can employ embodiments of the present invention. Moreover, embodiments of the present invention are described in terms of FIFO storage devices or units. However, embodiments of the present invention are not so limited, as any other type of storage device can be incorporated into embodiments of the present invention. For example, a stack-based storage device could be employed into embodiments of the present invention.

System Description

Figure 1:
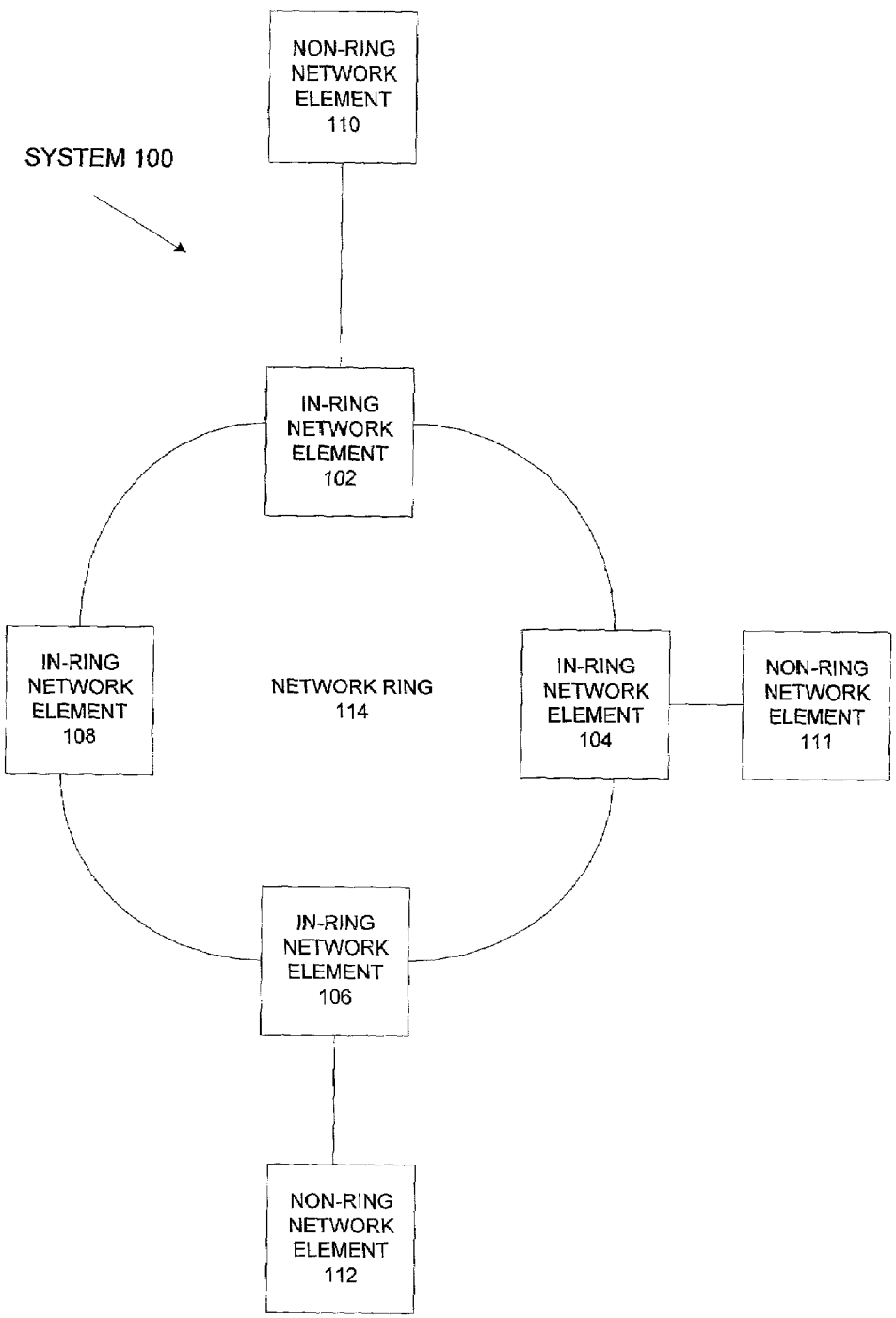
FIG. 1 is a block diagram illustrating a system that incorporates embodiments of the system in which the present invention is implemented.

FIG. 1 is a block diagram illustrating a system that incorporates embodiments of the system in which the present invention is implemented. In particular, FIG. 1 illustrates system 100 that includes network ring 114, which is comprised of in-ring network element 102, in-ring network element 104, in-ring network element 106, and in-ring network element 108. System 100 also include non-ring network element 110, non-ring element 111, and non-ring network element 112, which are coupled to network ring 114 through in-ring network element 102, in-ring network element 104 and in-ring network element 106, respectively. In an embodiment, non-ring elements 110–112 can be routers, switches, bridges, or other types of network element that switch data across a network.

In one embodiment, the connection among in-ring network element 102, in-ring network element 104, in-ring network element 106, and in-ring network element 108 allow for bi-directional traffic. Accordingly, this bi-directional capability allows for redundancy in the communication between the different network elements, such that if a given line of communication is lost, the data traffic to be transmitted thereon can be rerouted in the opposite direction to reach its intended destination within the ring architecture.

In an embodiment, system 100 transmits data traffic among the different network elements, both in-ring and non-ring, employing the Synchronous Optical Network ("SONET") standard or Synchronous Digital Hierarchy ("SDH"). However, embodiments of the system in which the present invention is implemented are not so limited, as data traffic among the different network elements can be transferred using other types of transmission standards. Examples of other types of transmission standards can include, but are not limited to, T1, T3, Data Signal ("DS")3, and DS1 signals. In one embodiment, data traffic among in-ring network element 102, in-ring network element 104, in-ring network element 106, and in-ring network element 108 includes Time Division Multiplexing ("TDM") traffic and packet traffic within a same TDM signal.

In this ring network, network elements are used that can transmit and receive TDM ring traffic. In addition, at least certain of the network elements provide two different switching techniques—TDM and packet. The packet switching provided can support any number of protocols including layer 2 and layer 3 type protocols such as ATM, Ethernet, Frame Relay, etc. In addition to typical operations of a TDM network element, the network elements are implemented to be able to: (1) programmably select on an STS basis certain of the incoming TDM traffic to be extracted and packet switched rather than TDM switched; and/or (2) receive packet traffic in another form and to be packet switched. Regardless of which switching technique is used, the switched traffic going back onto the ring is put in TDM format and transmitted out. However, each time traffic is packet switched, that traffic could be statistically multiplexed (e.g., the packets can be selectively dropped based on various criteria). A further description of the operation of system 100 and the network elements therein is described in more detail below.

The architecture and configuration of system 100 is by way of example and not by way of limitation, as embodiments of the present invention can be incorporated in other types of systems. For example, other such systems could incorporate less or more network elements into the network ring and/or network elements attached thereto. Moreover, embodiments of the system in which the present invention is implemented are not limited to the network ring architecture as illustrated in FIG. 1. Examples of other types of network architectures that can incorporate embodiments of the system in which the present invention is implemented include, but are not limited to, a point-to-point configuration, point-to-multipoint configuration, and a hub configuration. In addition, embodiments of the present invention are not limited to TDM networks, but also apply to Wave Division Multiplexing ("WDM") networks.

Network Element Description

Figure 2:
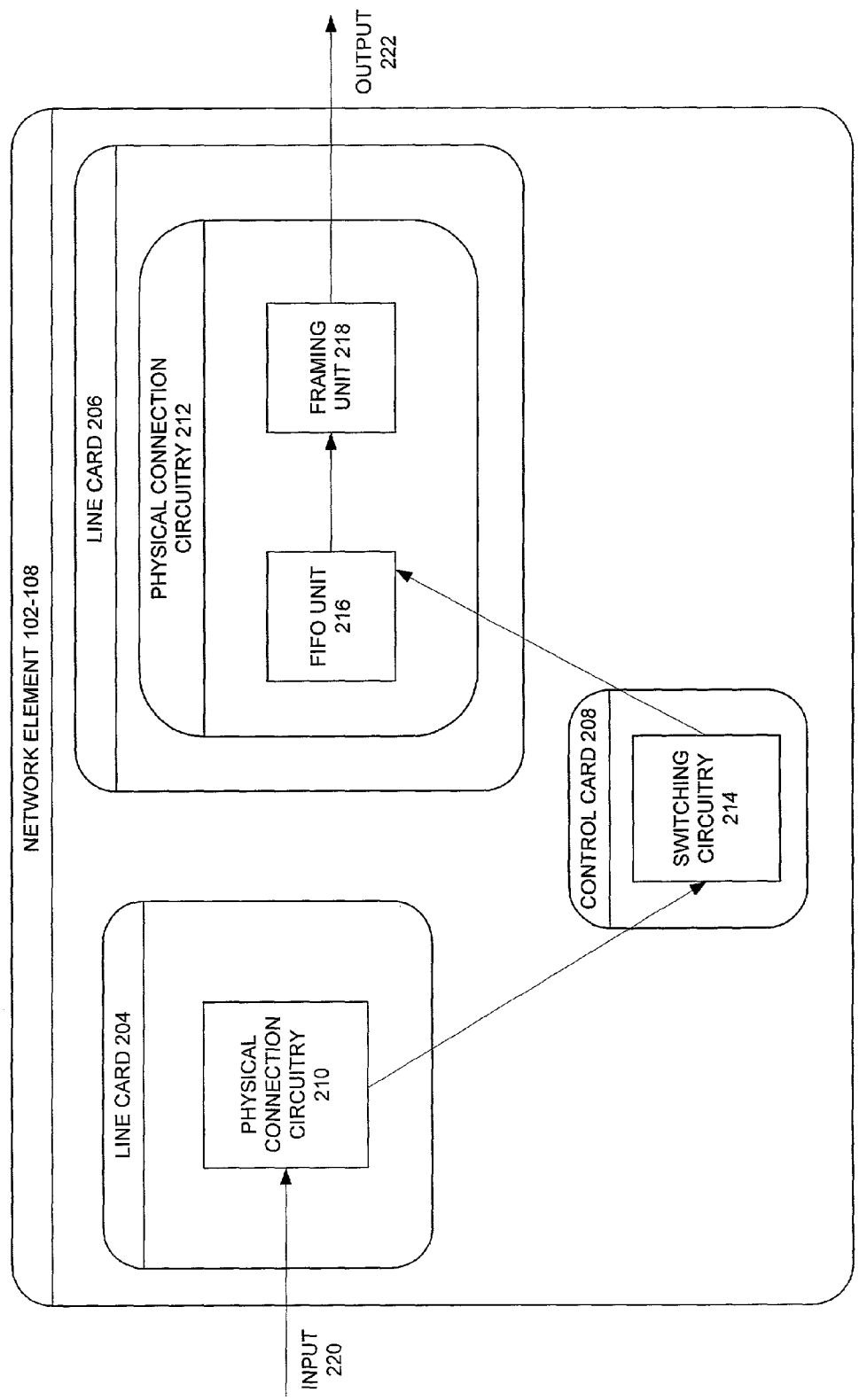
FIG. 2 illustrates portions of in-ring network elements 102–108, according to embodiments of the present invention.

FIG. 2 illustrates portions of in-ring network elements 102–108 (for purposes of FIG. 2, hereinafter "network element 102"), according to embodiments of the present invention. As shown, network element 102 includes line card 204, line card 206, and control card 208. Line card 204 contains physical connection circuitry 210, such that physical connection circuitry 210 is coupled to input 220. Control card 208 contains switching circuitry 214, such that switching circuitry 214 is coupled to physical connection circuitry 210. Line card 206 contains physical connection circuitry 212. Physical connection circuitry 212 contains FIFO unit 216 and framing unit 218, such that FIFO unit 216 is coupled to switching circuitry 214 and to framing unit 218, and further, such that framing unit is coupled to output 222. The circuitry and communication links illustrated within FIG. 2 are for the sake of simplicity and not by way of limitation, as a lesser or greater number of such circuits and communications links can be included within network element 102.

In one embodiment, physical connection circuitry 210 is coupled to a greater number of inputs. In another embodiment, framing unit 218 is coupled to a greater number of outputs. In a further embodiment, FIFO unit 216 is coupled to other circuits of network element 102. In one embodiment, input 220 is the output of another network element, e.g., network element 108 as depicted in FIG. 1. In another embodiment, output 222 is the input of another network element, e.g., network element 110. In a further embodiment input 220 is transmitting data at a different rate than output 220. In an embodiment, input 220 is transmitting data at a greater rate than output 220.

FIFO Unit 216 Description

FIG. 3 illustrates portions of FIFO unit 216, according to embodiments of the present invention. As shown, FIFO unit 216 contains synchronous FIFO 302, asynchronous FIFO 304, and control circuitry 306, such that all of these units of FIFO unit 216 are coupled together. In one embodiment, there may exist a different number of synchronous and asynchronous FIFOs within FIFO unit 216. Additionally, as shown, synchronous FIFO 302 is coupled to receive data from switching circuitry 214, while asynchronous FIFO 304 is coupled to output data to framing unit 218. Further illustrated are clock domain 308 and clock domain 310, such that a portion of asynchronous FIFO 304 is contained in clock domain 308 and a portion of asynchronous FIFO 304 is contained in clock domain 310. The division of asynchronous FIFO 304 between clock domain 308 and clock domain 310 is illustrated by the vertical dashed line passing through asynchronous FIFO 304, as depicted in FIG. 3. As will be described below, this division of the different clock domains within asynchronous FIFO 304 is due to the different data rates at which the data is inputted into and outputted from asynchronous FIFO 304.

Control circuitry 306 includes a number of read pointers, write pointers, double-sync circuitry, gray counter circuitry, depth circuitry, and flip-flops, as is known in the art. The number and size of components of control circuitry 306 for controlling asynchronous FIFO 304 is dependent on the size of the storage area for asynchronous FIFO 304. Additionally, the processing speed of asynchronous FIFO 304 increases as the amount of pointers and lookup tables within control circuitry 306 decreases. For example, if asynchronous FIFO 304 is of size $2^3$ bits, then the pointers and lookup tables are 3 bits each.

In one embodiment, synchronous FIFO 302 and asynchronous FIFO 304 are types of temporary storage devices, each with one or more storage areas in which to store data. In an embodiment, synchronous FIFO 302 has a larger storage capacity than asynchronous FIFO 304. In a further embodiment, data transferred within clock domain 308 is at a faster rate than data transferred within clock domain 310.

Operation of FIFO Unit 216

Certain operations of FIFO unit 216 will now be described in conjunction with the flowcharts of FIGS. 4(a–c). For purposes of simplicity and not by way of limitation, communication with only one switching circuitry and framing unit, i.e., switching circuitry 214 and framing unit 218, respectively as depicted in FIG. 3, will be discussed. However, other embodiments may include communication with other input and output sources. FIGS. 4(a–c) illustrate a combination of flowcharts of one embodiment for the receipt of data at a first rate and the transmission of data at a second rate, according to embodiments of the present invention. In particular, FIGS. 4(a–c) illustrate a combination of flowcharts for the transmission of data through clock domain 308 and clock domain 310, using synchronous FIFO 302 and asynchronous FIFO 304, according to embodiments of the present invention.

Figure 4A:
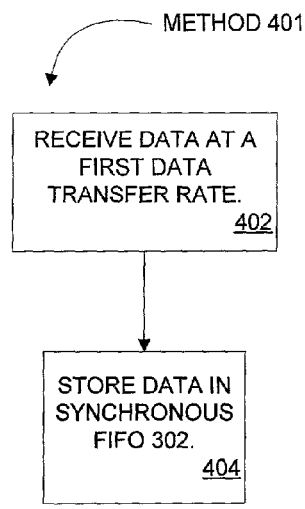
FIG. 4(a–c) illustrate a combination of flowcharts of one embodiment for the receipt of data at a first rate and the transmission of data at a second rate, according to embodiments of the present invention.

Method 401 of FIG. 4(a) commences with the receipt of data having a rate associated with clock domain 308 from switching circuitry 214, at process block 402. In an embodiment, the data is received at a first data rate, which can be at different data rates of a signal under a SONET standard. For example, the signal under the SONET standard could contain data based on a DS1, DS2, or DS3 standard, which would be extracted from the SONET frame. In one embodiment, this signal under the SONET standard is transmitted on an Optical Carrier ("OC")-48 signal. In another embodiment, this signal under the SONET standard is transmitted on an OC-3 signal. These data rates are by way of example and not by way of limitation, as other types of data rates could be received from switching circuitry 214. Control circuitry 306 causes the data to be stored in synchronous FIFO 302, at process block 404.

Figure 4C:
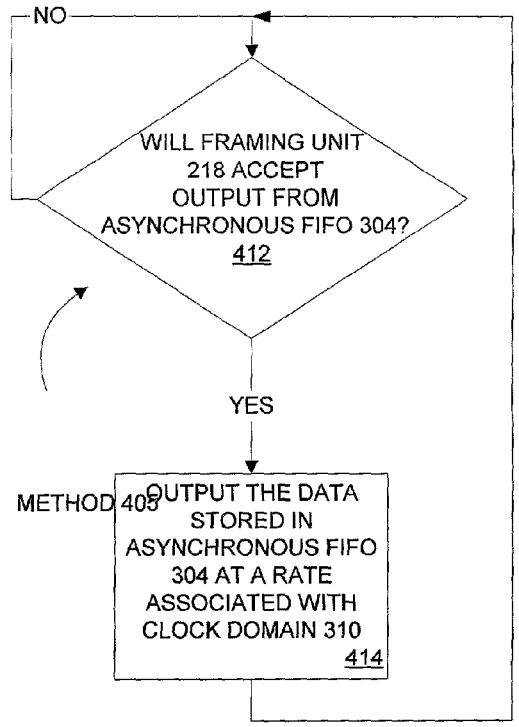
Figure 4B:
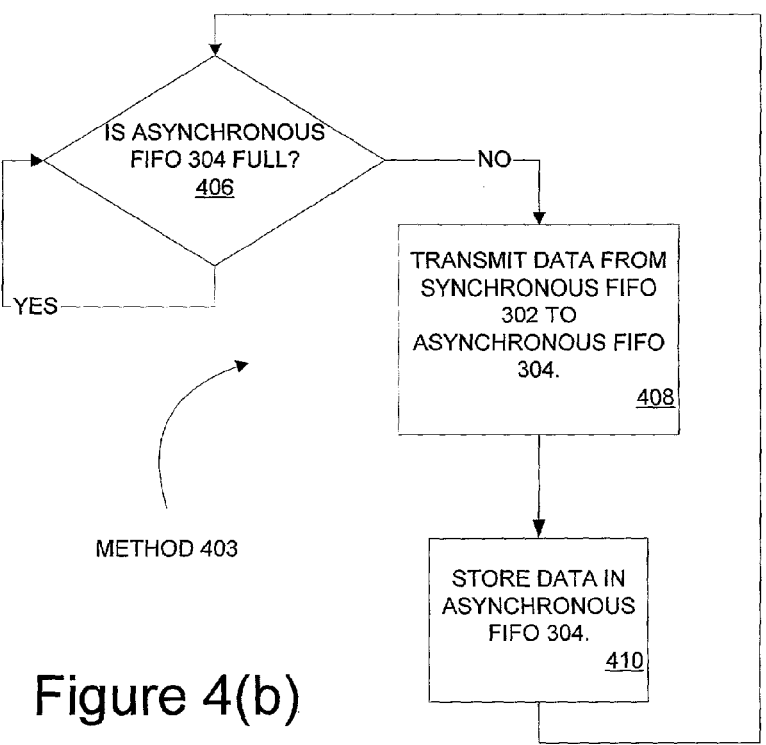

Method 403 of FIG. 4(b) commences at decision block 406, where control circuitry 306 determines whether the storage area within asynchronous FIFO 304 is full. In an embodiment, asynchronous FIFO 304 has a smaller storage capacity than synchronous FIFO 302, e.g., $2^3$ bits versus $2^{12}$ bits. However, embodiments of the present invention are not so limited, as asynchronous FIFO 304 and synchronous FIFO 302 may be of any capacity. If the storage area within asynchronous FIFO 304 is full, data is not transmitted to asynchronous FIFO 304, and the status check is repeated. In an embodiment, if the storage area within asynchronous FIFO 304 is not full, control circuitry 306 transmits 4096 bits of data residing in synchronous FIFO 302 to asynchronous FIFO 304, at process block 408. In another embodiment, control circuitry 306 transmits 4000 bits of data. In one such embodiment, the data being transmitted is that data that has resided within synchronous FIFO 302 for the longest time period. In a further embodiment, a different amount of data is transmitted. Control circuitry 306 stores the transmitted data in asynchronous FIFO 304, at process block 410.

Method 405 of FIG. 4(c) commences with control circuitry 306 determining whether framing unit 218 will accept output from asynchronous FIFO 304, at decision block 412. If framing unit 218 will accept output from asynchronous FIFO 304, control circuitry 306 outputs the data from asynchronous FIFO 304 to framing unit 218 at a second data rate that is different from the first data rate (described above), at process block 414. In one embodiment, the second data rate is at a data rate for a DS-3 signal, and is outputted on a T3 signal connection. In another embodiment, the second data rate is at a data rate for a DS-1 signal, and is outputted on a T1 signal connection. However, embodiments of the present invention are not so limited, as other data rates, which are different that the first data rate, can be used to output the data from asynchronous FIFO 304. Moreover, in one embodiment, the first data transfer rate associated with clock domain 308 is greater than the second data transfer rate associated with clock domain 3110. However, embodiments of the present invention are not so limited, as the data transfer rates may be different. For example, the data transfer rate associated with clock domain 308 may be equal to or less than the data transfer rate associated with clock domain 310.

In an embodiment, control circuitry 306 transmits 8 bits of data residing in asynchronous FIFO 304 to framing unit 218. In one such embodiment, the data being transmitted is that data that has resided within asynchronous FIFO 304 for the longest time period. Additionally, in an embodiment, the rate of transfer from asynchronous FIFO 304 to framing unit is different that the rate of transfer associated with clock domain 308. In another embodiment, the data is transmitted to a different recipient. In a further embodiment, a different amount of data is transmitted. The process continues, with the receipt of data in clock domain 308, control circuitry 306 controlling the transfer of the data among the FIFOs, and the transmission of data into clock domain 310 from clock domain 308.

As illustrated, embodiments of the present invention allow for a FIFO unit that includes both synchronous and asynchronous FIFO units. The synchronous FIFO unit receives the incoming data at a faster data transfer rate that what is being ultimately outputted from the FIFO unit, while allowing an asynchronous FIFO unit, which is smaller in size in comparison to the synchronous FIFO unit, to receive the data from the synchronous FIFO and transmit the data at a slower data transfer rate, which is ultimately outputted from the FIFO unit. Accordingly, a larger FIFO unit that is synchronous is employed to receive the data initially, while allowing a smaller asynchronous FIFO unit to 'convert' between the two data transfer rates. The amount of circuits within the control circuitry to control the asynchronous FIFO unit is, therefore, much less than would be required if one large asynchronous FIFO unit were employed to receive the data and convert the data from a first data transfer rate to a second data transfer rate.

The components illustrated herein, such as control circuitry 306, include a machine-readable medium on which is stored a set of instructions (i.e., software) embodying any one, or all, of the methodologies described herein. Software can reside, completely or at least partially, within these components. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM), random access memory (RAM), magnetic disk storage media; optical storage media, flash memory devices, electrical, optical, acoustical, or other form of propagated signals (e.g., carrier waves, infrared signals, digital signals, etc.), etc. Of course, one or more parts of the invention may be implemented using any combination of software, firmware, and/or hardware.

Thus, a method and apparatus for the transmission of data through multiple clock domains using synchronous and asynchronous FIFOs have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. An apparatus comprising:
   a synchronous storage device of a network element coupled with a network ring, the synchronous storage device to store data received at a first data transfer rate defined by a transmission standard;
   an asynchronous storage device of the network element coupled with a network ring, the asynchronous storage device coupled to the synchronous storage device; and
   control circuitry coupled to the synchronous storage device and to the asynchronous storage device, wherein the control circuitry is to transmit the data at the first data transfer rate from the synchronous storage device to the asynchronous storage device and wherein the control circuitry is to output the data from the asynchronous storage device at a second data transfer rate defined by a second communication transmission standard.

2. The apparatus of claim 1, wherein the synchronous storage device is a synchronous first-in-first-out register array.

3. The apparatus of claim 1, wherein the asynchronous storage device is an asynchronous first-in-first-out register array.

4. The apparatus of claim 1, wherein the first data transfer rate is greater than the second data transfer rate.

5. The apparatus of claim 1, wherein a storage area of the synchronous storage device is larger than a storage area of the asynchronous storage device.

6. An apparatus comprising:
   a synchronous storage device of a network element coupled with a network ring, the synchronous storage device having a first storage area and coupled to receive data at a first data transfer rate defined by a communication transmission standard;
   an asynchronous storage device of the network element coupled with the network ring, the asynchronous storage device having a second storage area and coupled to the synchronous storage device, wherein the first storage area is larger than the second storage area; and
   control circuitry coupled to the synchronous storage device and the asynchronous storage device, wherein the control circuitry is to transfer the data at the first data transfer rate from the synchronous storage device to the asynchronous storage device when the second storage area is not full and wherein the control circuitry is to output the data from the asynchronous storage device at a second data transfer rate defined by a second transmission standard.

7. The apparatus of claim 6, wherein the data of the first data transfer rate is part of a signal using the Synchronous Optical Network (SONET) standard.

8. The apparatus of claim 6, wherein the data at the second data transfer rate is part of a signal using the Data Signal (DS)-3 standard.

9. The apparatus of claim 6, wherein the synchronous storage device includes a synchronous first-in-first-out register array.

10. The apparatus of claim 6, wherein the asynchronous storage device includes an asynchronous first-in-first-out register array.

11. The apparatus of claim 6, wherein the first data transfer rate is faster than the second data transfer rate.

12. A method comprising:
    receiving data based on a Data Signal (DS)-3 standard from a payload of Synchronous Optical Network (SONET) frames, wherein the SONET frames are being transmitted on an Optical Carrier (OC) signal;
    extracting the data based on the DS-3 standard from the payload of the SONET frames;
    storing the data in a synchronous first-in-first-out register array (FIFO) having a first storage area;
    transferring the data from the synchronous FIFO to an asynchronous FIFO having a second storage area, wherein the first storage area is larger than the second storage area; and
    outputting the data based from the asynchronous FIFO at a DS-3 data rate on a T3 signal.

13. The method of claim 12, wherein the OC signal includes an OC-48 signal.

14. The method of claim 12, wherein the OC signal includes an OC-3 signal.

15. A line card on a network element comprising:
    a synchronous first-in-first-out register array (FIFO) having a first storage area and coupled to receive data based on a Data Signal (DS)-3 standard from a payload of Synchronous Optical Network (SONET) frames, wherein the SONET frames are being transmitted on an Optical Carrier (OC) signal;
    an asynchronous FIFO having a second storage area and coupled to the synchronous FIFO, wherein the first storage area is larger than the second storage area; and
    control circuitry coupled to the synchronous FIFO and the asynchronous FIFO, wherein the control circuitry is to transfer the data from the synchronous FIFO to the asynchronous FIFO when the second storage area is not full and wherein the control circuitry is to output the data from the asynchronous FIFO at a DS-3 data rate on a T3 signal.

16. The line card of claim 15, wherein the OC signal includes an OC-48 signal.

17. The line card of claim 15, wherein the OC signal includes an OC-3 signal.

18. A computer-readable medium that provides instructions, which when executed by a network element, cause the network element to perform operations comprising:
    receiving data based on a Data Signal (DS)-3 standard from a payload of Synchronous Optical Network (SONET) frames, wherein the SONET frames are being transmitted on an Optical Carrier (OC) signal;
    extracting the data based on the DS-3 standard from the payload of the SONET frames;
    storing the data in a synchronous first-in-first-out register array (FIFO) having a first storage area;
    transferring the data from the synchronous FIFO to an asynchronous FIFO having a second storage area, wherein the first storage area is larger than the second storage area; and
    outputting the data based from the asynchronous FIFO at a DS-3 data rate on a T3 signal.

19. The computer-readable medium of claim 18, wherein the OC signal includes an OC-48 signal.

20. The computer-readable medium of claim 18, wherein the OC signal includes an OC-3 signal.

* * * * *

UNITED STATES PATENT AND TRADEMARK OFFICE
CERTIFICATE OF CORRECTION

| | | |
|---|---|---|
| PATENT NO. | : 7,139,293 B1 | Page 1 of 1 |
| APPLICATION NO. | : 10/035538 | |
| DATED | : November 21, 2006 | |
| INVENTOR(S) | : Sophie H. Essen | |

It is certified that error appears in the above-identified patent and that said Letters Patent is hereby corrected as shown below:

On the cover page; Assignee: item (73)), replace "Redbacks Network Inc." with -- "Redback Networks Inc."--

Signed and Sealed this

Twentieth Day of February, 2007

JON W. DUDAS
*Director of the United States Patent and Trademark Office*